No. 708,560. Patented Sept. 9, 1902.
C. B. JOHNSON.
DEVICE FOR HITCHING HORSES TO SHAFTS.
(Application filed Jan. 10, 1902.)
(No Model.)
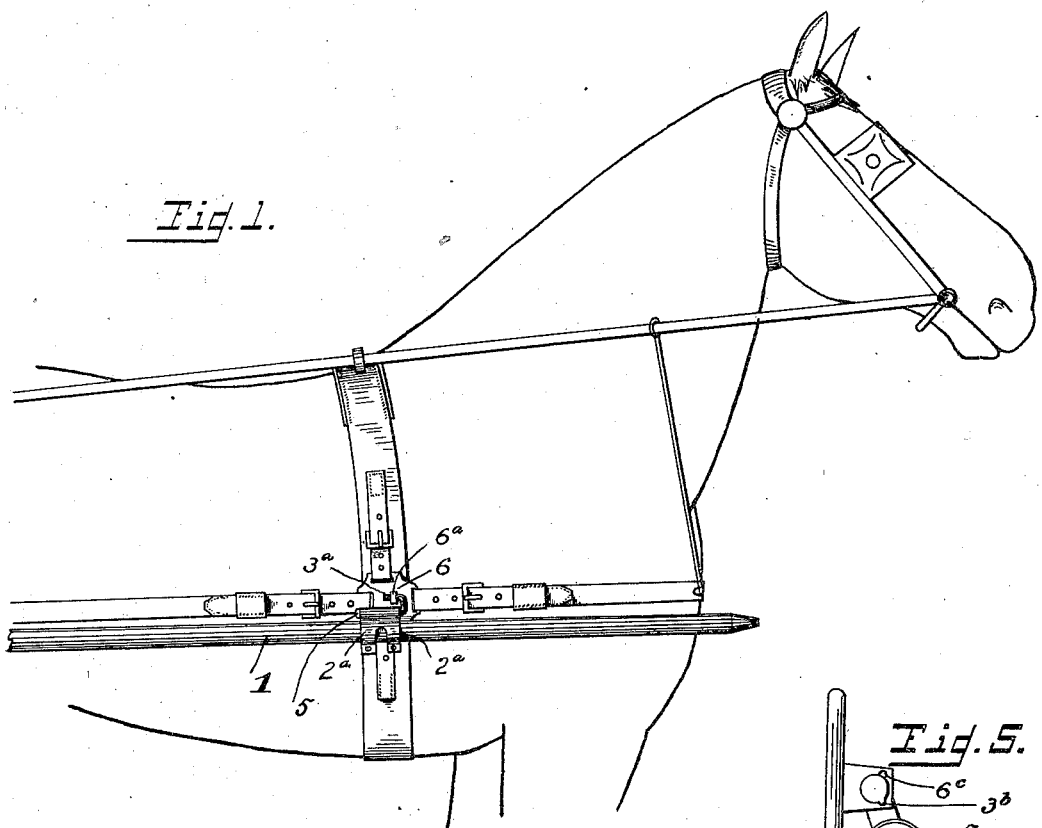
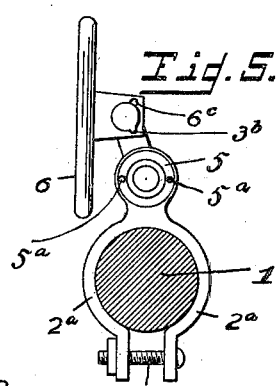
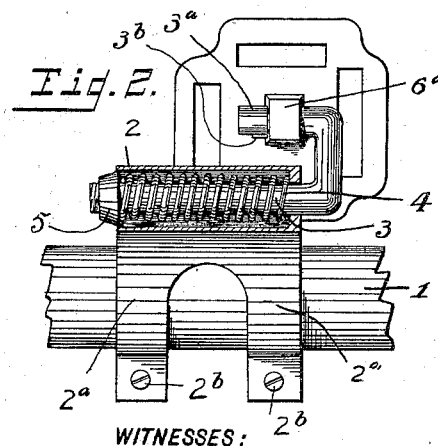
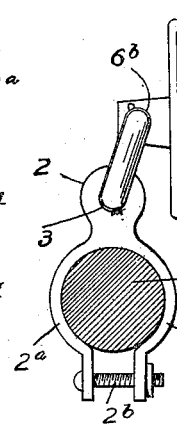
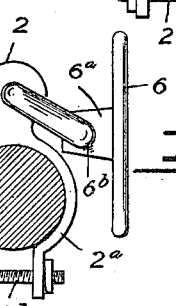
WITNESSES:
Benj. Finckel
S. W. Latham
INVENTOR
Charles B. Johnson
BY
Finckel & Finckel
his ATTORNEYS

UNITED STATES PATENT OFFICE.

CHARLES B. JOHNSON, OF COLUMBUS, OHIO.

DEVICE FOR HITCHING HORSES TO SHAFTS.

SPECIFICATION forming part of Letters Patent No. 708,560, dated September 9, 1902.

Application filed January 10, 1902. Serial No. 89,215. (No model.)

*To all whom it may concern:*

Be it known that I, CHARLES B. JOHNSON, a citizen of the United States, residing at Columbus, in the county of Franklin and State of Ohio, have invented certain new and useful Improvements in Devices for Hitching Horses to Shafts; and I do hereby declare the following to be a full, clear, and exact description of the invention, such as will enable others skilled in the art to which it appertains to make and use the same.

The invention relates to devices for hitching a horse to the shafts of a vehicle, in which there is a yielding or spring connection between the harness and the shafts to relieve the horse, as well as the occupants of the vehicle, of jar due to the starting of the horse and in which a singletree and traces are done away with, the special object of the present invention being to provide a simplified and cheapened construction that can be quickly manipulated to effect the hitching of the horse to the vehicle.

The nature of the improvement is set forth in the following description and claims.

In the accompanying drawings, Figure 1 is a side view of a portion of a harnessed horse and one shaft of the vehicle, showing my hitching device. Fig. 2 is a side view, partially in section, of the hitching device on a larger scale. Fig. 3 is an elevation of the forward edge of the hitching device as seen when in hitched position. Fig. 4 is the same sort of view with the shaft lifted to hitching or unhitching position with respect to the hitching-eye on the harness. Fig. 5 is an elevation of the rear edge of the hitching device as seen when in hitched position.

1 designates the shaft of the vehicle. Arranged at a point near the plane of the saddle or back straps is a tube or barrel 2, having formed therewith skirts or clip members $2^a$, which embrace the shaft and are secured thereto by screws $2^b$. Extending into the barrel 2 through a circular hole in the end thereof is the longer leg 3 of a J-shaped hook. Encircling the longer leg of the J-shaped hook is a stiff coil-spring 4, that is secured on the leg within the barrel by means of a circular nut 5, threading onto the end of said leg, said nut being provided with sockets $5^a$ to receive a proper wrench. From the construction shown and described it will be observed that the J-shaped hook can be rocked in its bearings in the barrel 2, the longer leg being the axis of motion of the hook.

$3^a$ designates the shorter leg of the J-shaped hook, and this is shown to be made with a small laterally-projecting lug or key $3^b$.

Secured to the saddle is a hitching plate or buckle 6, having a projecting eye or ear $6^a$, made with a circular horizontal hole $6^b$ of sufficient diameter to just admit the passage of the short leg $3^a$ of the J-shaped hook; but in order to permit this a supplemental keyway or groove $6^c$ is made in the side of the hole $6^b$ to permit the passage of the lug or key $3^b$ on the leg $3^a$. The groove $6^c$ is so located in the hole $6^b$ and the lug $3^b$ is so located on the leg $3^a$ that the shaft of the vehicle must be lifted and the short leg turned down, as seen in Fig. 4, to bring the lug into alinement with the groove before the short leg can be passed through the hole in the ear. After the short leg has been thus passed through the hole the shaft is allowed to drop and hang by gravity in its normal position, and in this position the said leg will be secured or hitched to the buckle-plate 6.

The hitching buckle-plate 6 is made with loops or eyes to receive the breeching-strap, the back or saddle strap, the breast-strap, and the belly-strap, as indicated in Fig. 1, the last-named loop or eye not being shown in the drawings, but being like the other loops or eyes will be easily understood.

When the horse starts off, the draft will first be upon the J-shaped hook and then against the coil-spring in the barrel 2, and hence the jar of the starting on the horse and vehicle will be avoided; but the important feature of the invention resides in the improved construction whereby ready and prompt hitching can be effected.

It is hardly necessary to add that the devices herein shown will be made in rights and lefts, each being the symmetrical duplicate of the other.

What I claim, and desire to secure by Letters Patent, is—

1. In a shaft-hitching device, a tube fixed to the shaft, a hook having two parallelly-extending legs one leg rockably secured in said tube, a spring on said leg, a projection on the other of said legs, a plate on the harness having an eye into which the latter leg can be inserted to be secured thereto only when the hook is turned out of normal position relatively to said plate, substantially as described.

2. In a shaft-hitching device, a tube 2 having securing skirts or clips 2ª for embracing the shaft formed integrally therewith, a hook having two parallelly and rearwardly extending legs, one leg extending into said tube and rockable therein, a spring on said leg, and means on the harness with which the other leg can be connected only when the legs are turned out of normal position, substantially as described.

In testimony whereof I affix my signature in presence of two witnesses.

CHARLES B. JOHNSON.

Witnesses:
GEORGE M. FINCKEL,
SAMUEL W. LATHAM.